3,029,242
SEPARATION OF HETEROCYCLIC NITROGEN
COMPOUNDS
Raymond N. Fleck, West Covina, and Carlyle G. Wight, Fullerton, Calif., assignors to Union Oil Company of California, Los Angeles, Calif., a corporation of California
No Drawing. Filed Dec. 23, 1958, Ser. No. 782,409
13 Claims. (Cl. 260—283)

This invention relates to the resolution of mixtures of heterocyclic nitrogen compounds, and in particular concerns an improved process for isolating the isomers of alkyl-substituted pyridines, quinoline, and alkyl-substituted quinolines.

There have been increased demands in recent years for the individual isomers of the alkyl-substituted pyridines and the alkyl-substituted quinolines in a high degree of purity. These heterocyclic materials are particularly useful as selective solvents and chemical intermediates. The pyridine and quinoline isomers with hydrocarbon substituent groups, i.e., substituted heterocyclic nitrogen compounds which have the same aromatic nucleii and the same number of carbon, hydrogen and nitrogen atoms, do not exhibit enough difference in selectivity with conventional adsorbents to make possible their separation by adsorption. Similarly, their boiling points are too close together to permit effective separation by distillation, and other methods of separation, e.g., chemical alteration of the components, fractional crystallization, etc., have proven unsatisfactory from the standpoint of product purity, economical operation and efficiency of recovery.

The present invention is based on our discovery that certain adsorbents of the molecular sieve type are selective with respect to certain heterocyclic nitrogen compounds which differ in molecular configuration from another heterocyclic nitrogen component of a mixture, e.g., mixtures of alkyl-substituted pyridine isomers, quinoline and isoquinoline, and alkyl-substituted quinoline isomers. More particularly we have found that the heterocyclic nitrogen isomers, selected from the class consisting of alkyl-substituted pyridines, alkyl-substituted quinolines, alkyl-substituted isoquinolines, quinoline and isoquinoline in which each of the alkyl groups contains from one to four carbon atoms, can be separated from each other in a mixture comprising the same by a process which comprises contacting the isomer mixture in either liquid or vapor phase with a lean Type X molecular sieve adsorbent to obtain a rich adsorbent containing the more readily adsorbed isomer in the feed mixture and an unadsorbed phase enriched in the less readily adsorbed isomer in the feed mixture; separating the rich adsorbent from the non-adsorbed phase; treating the rich adsorbent to desorb the selectively adsorbed isomer therefrom; and returning the adsorbent to a lean state for re-use in the next succeeding cycle of operation.

Considering now the process of the invention in detail, it is generally applicable to nitrogenous organic mixtures comprising at least two heterocyclic nitrogen isomers of the present class, e.g., methylpyridines, di-alkylpyridines, tri-alkylpyridines, quinoline, isoquinoline, ethylpyridines, propylpyridines, butylpyridines, methylquinolines, ethylquinolines, propylquinolines, butylquinolines, di-alkylquinolines, tri alkylquinolines and the like. These heterocyclic nitrogen mixtures may be derived from petroleum stocks, oil shale, tar sand, coke oven distillates, bone oils and other natural as well as synthetic sources. Usually such heterocyclic nitrogen compound streams will contain from 0 to about 50 percent hydrocarbons but the presence of such hydrocarbons in such amounts in no way affects the selectivity of the adsorbent. Of the total amount of heterocyclic nitrogen compounds of the present class in the feed stream, the more readily adsorbed heterocyclic nitrogen isomer may represent from about 1 to about 99 percent and the less readily adsorbed isomer may represent from about 99 to about 1 percent.

The adsorbents which are employed in accordance with the invention are crystalline Type X zeolitic partially dehydrated metallo alumino silicates having pores of substantially uniform diameter between about 7 A. and about 13 A. The term "Type X zeolite" refers to those metallo alumino silicates whose compositions, X-ray powder diffraction patterns and so-called X crystal structure are substantially the same as those attributed to "zeolite X" in British Patent 777,233. Certain naturally occurring minerals can be heated to dehydrate the molecules and obtain an activated zeolitic adsorbent of such type. However, we greatly prefer the synthetic materials which are conveniently prepared by heating suitable quantities of alumina and silica with an excess of sodium hydroxide and thereafter washing out the excess to obtain a synthetic crystalline Type X zeolitic sodium alumino silicate having a pore diameter of about 13 A. and having a typical approximate composition corresponding to

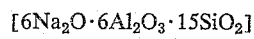
$$[6Na_2O \cdot 6Al_2O_3 \cdot 15SiO_2]$$

on a water-free basis. The uniform diameter of this product can be altered by exchanging part of the sodium cation with other atoms. For example, such a product can be heated with a concentrated solution of a calcium salt, e.g., calcium chloride at superatmospheric pressure and at 20° C.–175° C., washed with water to remove excess calcium chloride, and thereafter partially dehydrated by heating to obtain a Type X calcium sodium alumino silicate having a pore diameter of about 10 A. and having a typical average molecular structure on a water-free basis corresponding to

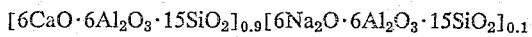
$$[6CaO \cdot 6Al_2O_3 \cdot 15SiO_2]_{0.9}[6Na_2O \cdot 6Al_2O_3 \cdot 15SiO_2]_{0.1}$$

Other divalent cations such as magnesium and barium may be employed instead of calcium. Further details regarding the properties and preparation of Type X molecular sieves are to be found in the aforementioned British patent. While any Type X molecular sieve having a pore diameter between 7 A. and 13A. may be employed in accordance with the invention, it is preferred to use the 10 A. calcium sodium alumino silicate referred to above which is available commercially under the trade name "Molecular Sieve 10X." These commercial materials may contain substantial amounts of inert binder materials.

The optimum particle size of the adsorbent will depend upon the manner in which it is used in the process, i.e., as a fixed compact bed, moving compact bed, a fluidized bed, etc,. but is usually between about 2 and about 400 mesh, preferably between about 4 and about 30 mesh for fixed and moving compact beds and between about 100 and about 300 mesh for fluidized beds.

The adsorbent is preferably employed in the form of a dense compact fixed or moving bed which is alternately contacted with the feed and then desorbed. In the simplest embodiment of the invention the adsorbent is employed in the form of a single static bed, in which case the process is only semi-continuous. Preferably a set of two or more static beds is employed in fixed-bed contacting with appropriate valving so that the feed stream is passed through one or more adsorbent beds while the desorption is carried out in one or more other beds in the set.

The direction of flow during adsorption and desorption may be either up or down through the adsorbent but preferably the adsorption is carried out in one flow direction and the desorption in the other. Any of the conventional apparatus employed in static bed fluid-solids contacting may be used. A moving compact bed of an adsorbent has a greater separation efficiency than a fixed compact bed of the same size because of the ability of the former to provide reflux. The moving compact bed is, therefore, preferable when a high degree of separation is desired or when the feed mixture separation factor is poor.

As previously stated, the feed mixture is contacted with the adsorbent in either the vapor or liquid phase. The pressure is usually near atmospheric but may be either subatmospheric or superatmospheric. In general, the adsorption is carried out at a temperature between about 0° F. and about 800° F., preferably between about 100° F. and 700° F. and at pressures between about atmospheric and about 1000 p.s.i.g. preferably between about 0 p.s.i.g. and about 100 p.s.i.g.

The immediate products of the initial adsorption step are an unadsorbed or raffinate phase which is rich in the more readily adsorbed heterocyclic nitrogen isomer of the feed mixture and lean in the less readily adsorbed heterocyclic nitrogen isomer, and a solid rich adsorbent containing an adsorbate rich in the more readily adsorbed heterocyclic nitrogen isomer of the feed fixture and lean in the less readily adsorbed heterocyclic nitrogen isomer. The solid adsorbent and the unadsorbed phase are separated and the latter is passed to storage as one of the heterocyclic nitrogen isomer products of the process. The rich adsorbent on the other hand is treated to desorb the heterocyclic nitrogen isomer therefrom and to return the adsorbent to a lean state for re-use. According to one mode of operation, such treatment comprises subjecting the rich adsorbent to an elevated temperature and/or reduced pressure. The use of elevated temperatures and/or reduced pressures may also be combined with the use of a stripping gas or a displacement exchange fluid in the known manner.

In accordance with a preferred mode of operation, the rich adsorbent is treated with a suitable displacement exchange fluid at approximately the same temperature and pressure as that employed in the initial adsorption state. The displacement exchange fluid may be any material which is inert with respect to the adsorbent and the feed mixture, which is adsorbable by the adsorbent, and which is readily separated from the components of the feed mixture by distillation, adsorption, or other conventional means. Preferably the displacement exchange fluid is one which has a boiling point substantially outside the boiling range of the feed mixture and has an adsorbability substantially the same as that of the adsorbed components of the feed mixture. Pyridine is a preferred displacement exchange fluid for the process and the quinoline isomers are especially preferred when separating the alkyl-substituted quinolines. Other materials which may be employed include the alkyl-substituted pyridines and the alkyl-substituted quinolines having a boiling point at least 10° C., and preferably 20° C., outside of the boiling range of the feed mixture.

The following examples specifically inllustrate the practice of the invention.

EXAMPLE I

Each of a wide variety of heterocyclic nitrogen isomer mixtures, diluted with iso-octane for ease in handling, is contacted in the liquid phase with a lean granular "Molecular Sieves 10X" adsorbent (10 A. calcium sodium alumino silicate) for about 1 hour at about 212° F. and about atmospheric pressure. The unadsorbed phase is then separated from the rich adsorbent and analyzed for the distribution of the heterocyclic feed components. The results of these adsorptive separations are shown in Table 1 where component B is selectively adsorbed.

Table 1

| Component (A) | Component (B) | Composition, weight percent (Solvent free basis) | | | |
|---|---|---|---|---|---|
| | | Feed | | Unabsorbed phase | |
| | | (A) | (B) | (A) | (B) |
| 2,5-dimethyl pyridine | 2,4-dimethyl pyridine | 46 | 54 | 49 | 51 |
| 2,3-dimethyl pyridine | 4-ethyl pyridine | 34 | 66 | 40 | 60 |
| 8-methyl quinoline | 7-methyl quinoline | 50 | 50 | 76 | 24 |
| 2,5-dimethyl pyridine | 3,4-dimethyl pyridine | 49 | 51 | 62 | 38 |
| quinoline | isoquinoline | 51 | 49 | 68 | 32 |
| 2-methyl quinoline | 4-methyl quinoline | 51 | 49 | 64 | 36 |
| 5-methyl quinoline | 7-methyl quinoline | 49 | 51 | 52 | 48 |
| 6-methyl quinoline | 3-methyl isoquinoline | 50 | 50 | 52 | 48 |
| 3-methyl isoquinoline | 4-methyl isoquinoline | 46 | 54 | 51 | 49 |
| 8-methyl quinoline | 6-methyl quinoline | 50 | 50 | 69 | 31 |

The rich adsorbent from each of the separations shown in Table 1 is then desorbed by liquid phase displacement exchange with pyridine yielding essentially complete recovery of the adsorbate enriched in component B of Table 1.

It will be noted that in the experimental procedure described above the heterocyclic nitrogen isomer mixtures are dissolved in an organic solvent prior to being liquid-phase contacted with the adsorbent at the operating conditions. While not necessary to the operability of the invention, such use of a solvent is usually preferred since it facilitates contact between the liquid feed mixture and the solid adsorbent. Any liquid which is capable of dissolving the feed mixture but which is readily separable therefrom and from the displacement exchange fluid, e.g., by distillation or chilling, and which is less readily adsorbed by the adsorbent than the more readily adsorbable components of the feed stream may be employed as such solvent, e.g., relatively low molecular weight iso-paraffins such as iso-octane, iso-decane, and the like and aromatic hydrocarbons such as benzene, toluene, xlyene, etc.

EXAMPLE II

In this example two representative vapor phase separations are carried out with pairs of alkyl-substituted heterocyclic nitrogen isomers as shown in Table 2. The heterocyclic nitrogen feed mixture is, in each run, vapor phase contacted with a lean granular "Molecular Sieves 10X" (10 A. calcium sodium alumino silicate) for about one hour at about 200° C. and one atmosphere. The unadsorbed phase is then separated from the rich adsorbent and analyzed. Table 2 shows the selective adsorption of component (B).

Table 2

| Component (A) | Component (B) | Composition, weight percent | | | |
|---|---|---|---|---|---|
| | | Feed | | Unadsorbed phase | |
| | | (A) | (B) | (A) | (B) |
| 4-methyl pyridine | 3-methyl pyridine | 55 | 45 | 57 | 43 |
| 4-ethyl pyridine | 3,4-dimethyl pyridine | 49 | 51 | 58 | 42 |

The rich adsorbent from each of the separations shown in Table 2 is then desorbed by vapor phase displacement exchange with pyridine at the same temperature and pressure as in the above adsorption step. There is essentially complete recovery of the adsorbate which is substantially enriched in component (B).

EXAMPLE III

In this run, the unadsorbed phase from the separation of 4-methylpyridine and 3-methylpyridine in Example II is reprocessed in the same manner as the original feed and a correspondingly higher 4-methylpyridine concentration is obtained in the resulting raffinate phase. The final 4-methylpyridine concentration is about 96 percent after nine successive stages of treatment.

When a cation other than calcium, e.g., barium, strontium, sodium, potassium, etc., is employed in the preparation of the "Type X" zeolitic crystalline metallo alumino silicate adsorbents, similar selective separations are obtained with the heterocyclic isomer mixtures of Examples I and II.

Although the deactivation of the adsorbent is gradual, some deactivation may eventually occur. It is within the scope of this invention to reactivate the silicate adsorbent by high temperature contacting with a hot reactivating gas such as flue gas, air, etc.

As will be apparent, the process of the invention essentially comprises solids-fluid contacting operations, and any of the various techniques and equipment conventionally applied to such type of operation may be adapted to the practice of the invention without departing from the scope thereof. Thus, while it is often preferred to maintain the adsorbent in the form of a moving bed, i.e., as a solids-fluid contacting operation in which a compact bed of the adsorbent is passed successively through adsorption and desorption zones where it is concurrently or countercurrently contacted with the feed stream and the displacement exchange fluid, respectively, the process is nevertheless operable in the form of a fixed compact bed. Also, the solids-fluid contacting operation may be carried out employing fluidized techniques whereby the adsorbent is employed in relatively small particle size and is suspended by the flow of the fluid with which it is contacted.

Other modifications and adaptations which would occur to one skilled in this particular art are to be included in the spirit and scope of this invention as defined by the following claims.

We claim:

1. The process for separating a mixture consisting essentially of at least two isomers selected from the class consisting of alkyl pyridines, alkyl quinolines, alkyl isoquinolines, quinoline and isoquinoline in which each of the alkyl groups is of one to four carbon atoms, which process comprises: (1) contacting said mixture with a lean granular adsorbent consisting essentially of a partially dehydrated crystalline metallo alumino silicate having pores of substantially uniform diameter between about 7 A. and about 13 A. whereby there is obtained a rich adsorbent containing the more readily adsorbed isomer and a raffinate product which is rich in the less readily adsorbed isomer; (2) separating said raffinate product from said rich adsorbent; and (3) removing said more readily adsorbed isomer from said rich adsorbent.

2. A process as defined in claim 1 wherein the said adsorbent comprises a calcium sodium alumino silicate having substantially uniform pores of about 10 A. in diameter.

3. A process for treating a mixture consisting essentially of at least two isomers selected from the class consisting of alkyl pyridines, alkyl quinolines, alkyl isoquinolines, quinoline and isoquinoline in which each of the alkyl groups is of one to four carbon atoms, which process comprises: (1) contacting said mixture with a solid granular lean adsorbent consisting essentially of a partially dehydrated crystalline zeolitic metallo silicate having pores of substantially uniform diameter between about 7 A. and about 13 A., said contacting being effected at a temperature between about 0° F. and about 800° F. and at a pressure below 1,000 p.s.i.g. whereby there is obtained a rich adsorbent containing the more readily adsorbed isomer and a raffinate product which is rich in the less readily adsorbed isomer; (2) separating said raffinate product from said rich adsorbent; and (3) removing said more readily adsorbed isomer from said rich adsorbent.

4. A process according to claim 3 wherein the metal of said metallo alumino silicate adsorbent is predominately a divalent metal.

5. A process according to claim 3 wherein the metal of said metallo alumino silicate adsorbent is predominately calcium and wherein the pore diameter of said adsorbent is about 10 A.

6. A process as defined by claim 3 wherein in step 3 the rich adsorbent is desorbed with a displacement exchange fluid to obtain an extract product consisting essentially of said desorbed isomer and said displacement fluid, and separating said displacement exchange fluid from said extract product.

7. A process according to claim 3 wherein step 1 and step 3 are carried out at substantially the same temperature and pressure.

8. A process according to claim 6 wherein the said displacement exchange fluid is pyridine.

9. A process according to claim 6 wherein the said displacement exchange fluid is selected from the class consisting of quinoline and isoquinoline, and is readily separable from the components of said mixture.

10. A process according to claim 6 wherein said mixture and said displacement exchange fluid are passed in contact with said adsorbent in opposite flow directions.

11. A process as defined by claim 6 wherein in step 1 said adsorbent is moved through an adsorption zone in contact with said mixture and in step 3 said rich adsorbent is moved through an exchange zone in contact with said displacement exchange fluid.

12. The method of separating a mixture consisting essentially of at least two isomers selected from the class consisting of alkyl pyridines, alkyl quinolines, alkyl isoquinolines, quinoline and isoquinoline in which each of the alkyl groups is of one to four carbon atoms each, which process comprises: (1) contacting an organic mixture comprising said isomers with a lean granular adsorbent consisting essentially of a partially dehydrated crystalline calcium sodium alumino silicate having pores of substantially uniform pores of about 10 A. in diameter, said contacting being effected at a temperature between about 100° F. and about 700° F. and at a pressure between about 0 p.s.i.g. and about 100 p.s.i.g. whereby there is obtained a rich adsorbent containing the more readily adsorbed isomer and a raffinate product which is rich in the less readily adsorbed isomer; (2) separating said raffinate product from rich adsorbent; and (3) removing said more readily adsorbed isomer from said rich adsorbent.

13. The process for separating a fluid mixture consisting essentially of at least two isomers selected from the class consisting of alkyl pyridines, alkyl quinolines, alkyl isoquinolines, quinoline and isoquinoline in which each of the alkyl groups is of one to four carbon atoms, which process comprises: contacting said mixture with a solid granular adsorbent consisting essentially of a partially dehydrated crystalline metallo alumino silicate having pores of substantially uniform diameter between about 7 A. and about 13 A.; and separating the solid phase from the fluid phase.

References Cited in the file of this patent

UNITED STATES PATENTS

| | | |
|---|---|---|
| 2,291,419 | Strickland | July 28, 1942 |
| 2,391,270 | Reimers | Dec. 18, 1945 |
| 2,402,158 | Glowacki et al. | June 18, 1946 |
| 2,606,143 | Smith et al. | Aug. 5, 1952 |
| 2,763,603 | Skinner | Sept. 18, 1956 |
| 2,818,411 | Dimond | Dec. 31, 1957 |

FOREIGN PATENTS

| | | |
|---|---|---|
| 777,233 | Great Britain | June 19, 1957 |